(No Model.)
C. W. SPONSEL.
BICYCLE.
No. 392,889. Patented Nov. 13, 1888.
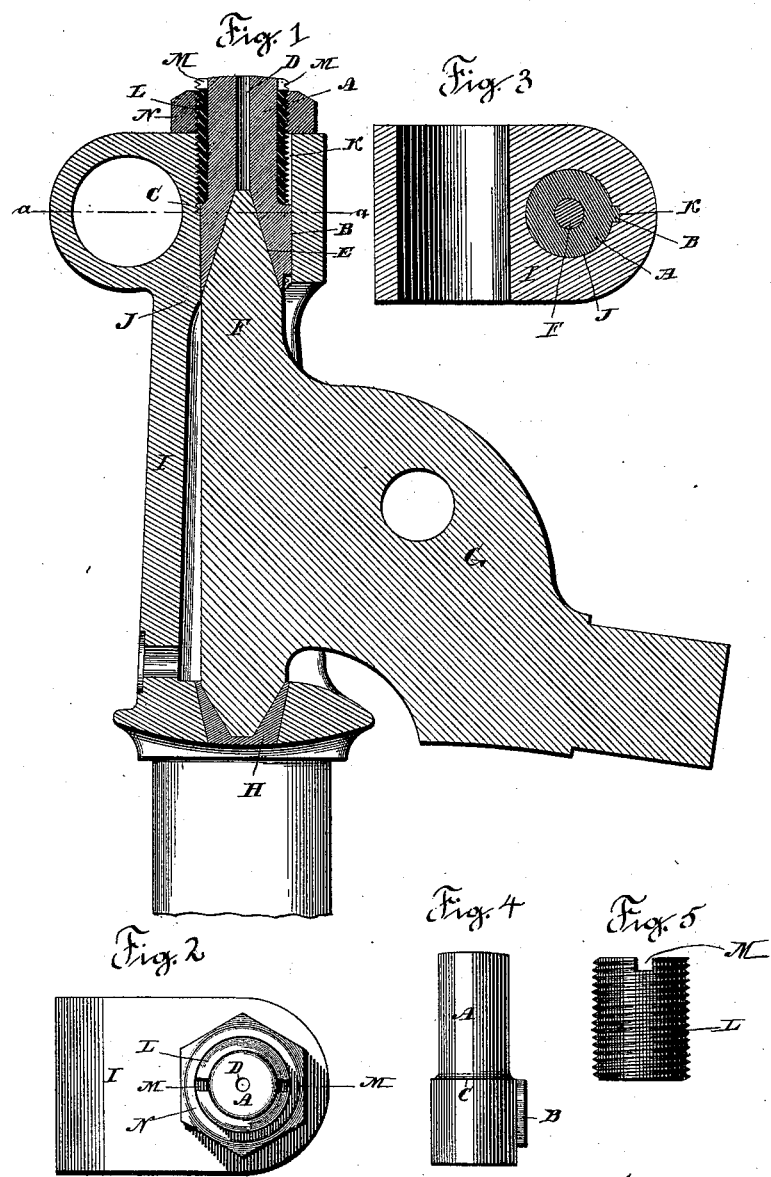
Witnesses:
Chas. B. Shumway.
William Harrison.
Inventor,
Charles W. Sponsel,
George D. Seymour
By
Atty.

UNITED STATES PATENT OFFICE.

CHARLES W. SPONSEL, OF HARTFORD, CONNECTICUT, ASSIGNOR TO THE OVERMAN WHEEL COMPANY, OF BOSTON, MASSACHUSETTS.

BICYCLE.

SPECIFICATION forming part of Letters Patent No. 392,889, dated November 13, 1888.

Application filed July 6, 1888. Serial No. 279,235. (No model.)

*To all whom it may concern:*

Be it known that I, CHARLES W. SPONSEL, residing at Hartford, in the county of Hartford and State of Connecticut, have invented certain new and useful Improvements in Bicycles; and I do declare the following to be a full, clear, and exact description of the same, reference being had to the accompanying drawings, which form a part of this specification.

My invention relates to an improvement in that class of steering-heads for bicycles in which the upper bearing is locked against rotation and held in place by an annular adjusting-sleeve, the object being to produce a head of this general construction which shall be simple, strong, durable, efficient, and inexpensive, and protected against the injury or displacement of its parts under severe use.

With these ends in view my invention consists in a bearing locked against rotation and confined to vertical movement in one line, in combination with an annular adjusting-screw sleeved over its smooth upper end and following it down as it is worn away, and in certain details of construction and combinations of parts, as will be hereinafter described, and pointed out in the claims.

In the accompanying drawings, Figure 1 is a view in vertical central section of a steering-head embodying my invention. Fig. 2 is a plan view of the upper end of the head, showing the bearing, adjusting-screw, and check-nut. Fig. 3 is a view in transverse section on the line $a$ $a$ of Fig. 1. Fig. 4 is a detached view in side elevation of the bearing; and Fig. 5 is a similar view of the annular adjusting-screw.

As herein shown, the smooth cylindrical bearing A is provided at its lower end and upon its outer face with a longitudinal locking projection or key, B, and with a shoulder, C, located just above such key and formed by reducing the upper part of the bearing in diameter. A central longitudinal oiling-passage, D, leads from the upper end of the bearing into the upper end of a conical recess, E, formed in its lower face and adapted to receive the coned upper end of the spindle F, carried by the perch G, and having its coned lower end seated in a hardened steel cup, H, set into the lower end of the shell I of the head.

A cylindrical chamber, J, having its inner wall threaded, is formed in the upper end of the said shell and provided with an offsetting vertical slot, K, adapted to receive the key B of the bearing A, the smooth lower end whereof fits snugly into the lower end of the said chamber, in which the bearing has endwise movement. An exterior-threaded annular screw, L, screwed into the upper end of the chamber J, is sleeved over the smooth upper end of the bearing and occupies the space or chamber formed by reducing the upper end of the bearing, with the shoulder whereof its lower end engages to hold the bearing against outward endwise displacement and to follow it down as it wears away. The upper end of this sleeve is provided with transverse slots M M, to receive a key for turning it. A check-nut, N, screws down over the projecting upper end of the screw and bears upon the flat upper face of the shell, above which face the screw and bearing project.

By locking the bearing against rotation and making its outer face smooth the adjusting-screw is relieved from the twisting, and hence loosening, strain imposed upon the bearing by the spindle, whereby the adjustment of the head is preserved unimpaired, while by confining the bearing to vertical movement in one line its wearing-surfaces are always preserved in the same relation to the spindle to obvious advantage. The locking of the bearing directly into the shell of the head secures a strong and stable connection between these parts, and avoids the use of any intermediate locking devices troublesome to manage and exposed and liable to breakage or injury in severe use of the machine.

My improved construction calls for but few parts, and those are simple, strong, and durable. It is efficient in use, easily operated, and inexpensive of manufacture.

I am aware that it is not broadly new to lock the upper bearing of a steering-head against rotation, or to hold the bearing against endwise displacement by an adjustable piece located above it. I do not therefore claim either of these features, broadly, but only the particular construction shown and described.

Having fully described my invention, what I claim as new, and desire to secure by Letters Patent, is—

1. A steering-head having a bearing locked against rotation and confined to vertical movement in one line, and an annular adjusting-screw sleeved over the smooth upper end of the bearing threaded into the shell of the head and following the bearing, which it holds against outward endwise displacement, substantially as set forth.

2. A steering-head having a chambered shell and a bearing, one of which parts has a slot and the other a projection fitting into such slot, whereby the bearing is locked against rotation and confined to vertical movement in one line, and an annular adjusting-screw sleeved over the smooth upper end of the bearing, threaded into the shell and following the bearing and holding it against outward endwise displacement, substantially as set forth.

3. A steering-head having a chambered shell, a bearing having smooth exterior surfaces, shouldered near its lower end, which is the largest, locked against rotation in such shell and confined to vertical movement in one line, and an annular adjusting-screw sleeved over the smooth upper end of the bearing and engaging directly with the shoulder of the bearing to hold the same in place, substantially as set forth.

4. A steering-head having a chambered shell, a bearing having smooth exterior surfaces, shouldered near its lower end, and provided below such shoulder with a locking projection or key entering a vertical slot in the shell, an annular adjusting-screw sleeved over the smooth upper end of the bearing and engaging with the shoulder thereof, and a check-nut screwing over the upper end of the sleeve, substantially as set forth.

In testimony whereof I have signed this specification in the presence of two subscribing witnesses.

CHARLES W. SPONSEL.

Witnesses:
  THEODORE LYMAN,
  F. CHAMBERLIN.